United States Patent
Pfersch, Jr. et al.

[15] 3,667,057
[45] May 30, 1972

[54] METHOD AND MEANS FOR PROVIDING AN OUTPUT CORRESPONDING TO THE AVERAGE OF ACCEPTABLE INPUT SIGNALS

[72] Inventors: George H. Pfersch, Jr., Dover; Jerry Doniger, Montvale, both of N.J.

[73] Assignee: The Bendix Corporation

[22] Filed: May 22, 1970

[21] Appl. No.: 39,817

[52] U.S. Cl. ............................. 328/156, 307/219, 307/235, 328/117, 328/147, 328/148, 328/158
[51] Int. Cl. .......................................... G06g 7/14, H03k 5/20
[58] Field of Search ......................... 307/204, 219, 235, 247; 328/116, 117, 146, 147, 148, 156, 157, 158, 169, 159; 340/146.1; 318/564; 244/77 SE, 77 M

[56] References Cited

UNITED STATES PATENTS 3,530,381  9/1970  Hogg et al. ............................ 328/146 X
3,289,193  11/1966  Worthington et al. ............. 307/235 X
3,544,778  12/1970  Masters, Jr. ......................... 307/204 X
3,422,327  1/1969  McBrayer et al. .................. 318/564 X
3,135,874  6/1964  Lucas et al. .......................... 328/104

OTHER PUBLICATIONS

Del Toro & Parker, Principles of Control Systems Engineering, pp. 545 & 550, McGraw-Hill Book Co., 1960.

Primary Examiner—Donald D. Forrer
Assistant Examiner—L. N. Anagnos
Attorney—Ronald G. Gillespie and Plante, Hartz, Smith and Thompson

[57] ABSTRACT

A circuit has averaging means for providing an output corresponding to the average acceptable input signals, a comparator for comparing each input signal to the average output, and switching means controlled by the comparator for eliminating unacceptable input signal from the average when the signals differ a predetermined amount from the average output.

3 Claims, 1 Drawing Figure

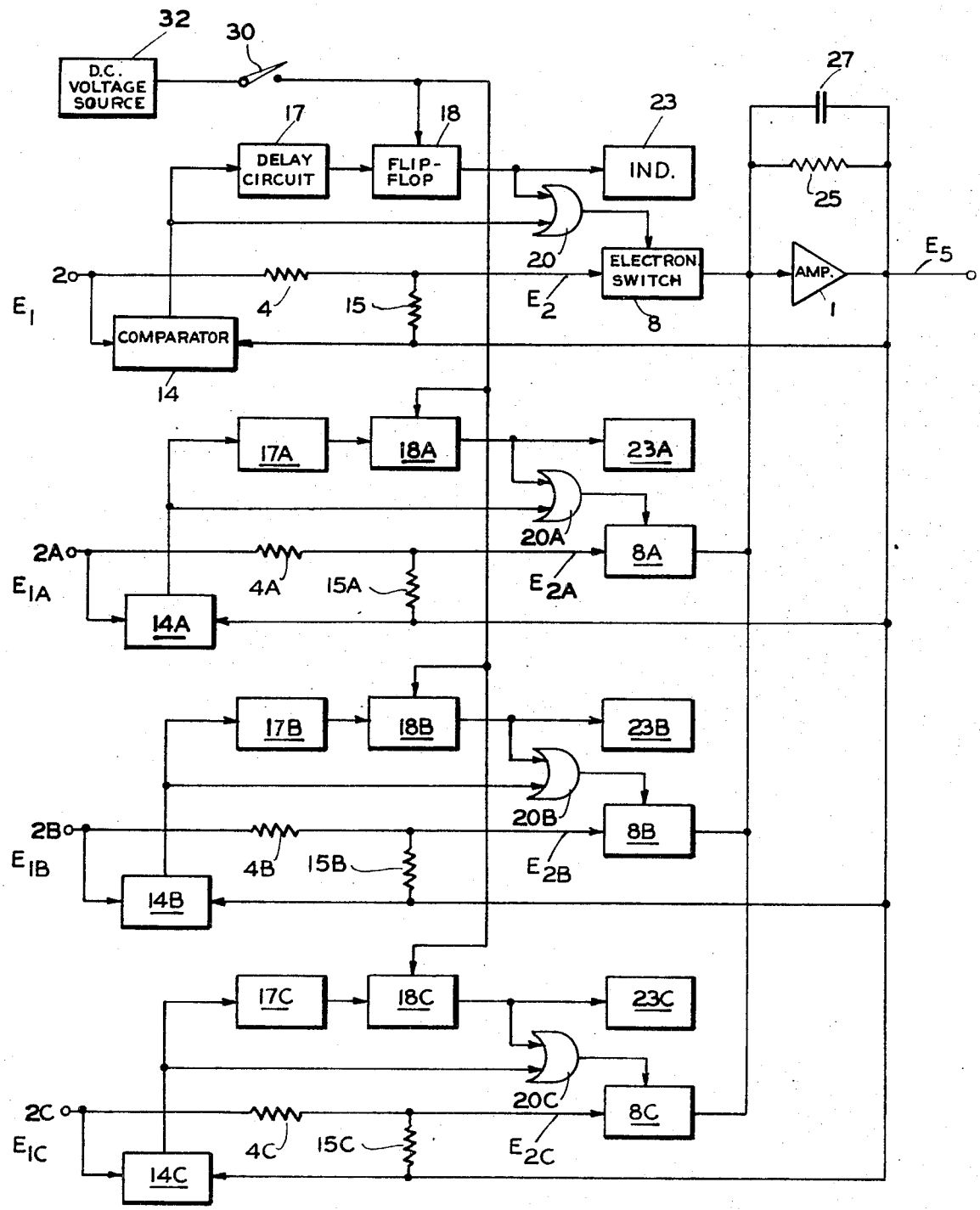

3,667,057

METHOD AND MEANS FOR PROVIDING AN OUTPUT CORRESPONDING TO THE AVERAGE OF ACCEPTABLE INPUT SIGNALS

BACKGROUND OF THE INVENTION

1. Field of the Invention

This invention relates to signal averaging circuits in general and, more particularly, to a signal averaging network with indicating means.

2. Description of the Prior Art

Heretofore, voters such as disclosed in U.S. application Ser. No. 860,315, filed on Sept. 23, 1969, now U.S. Pat. No. 3,619,791 by Harold Moreines and assigned to The Bendix Corporation, assignee of the present invention, compared the input signals with each other and passed one of the acceptable input signals to the output. The network of the present invention differs from the Moreines voter in that each input signals is compared with the output signal which has an amplitude that is the average of the acceptable input signals. The present averaging circuit provides an output signal even when there is only one acceptable input signal whereas Moreines type voters will provide an output signal selected from the majority of the input signals. Thus, a five-input voter requires at least three acceptable input signals to be operative.

SUMMARY OF THE INVENTION

A circuit for providing an output corresponding to the average of acceptable input signals and for eliminating from the average unacceptable input signals which differ from the average by a predetermined amount. The circuit includes a network, responsive to the input signals, for providing an output corresponding to the average of the acceptable input signals. Comparators compare each input signal to the average output and control switches to eliminate unacceptable input signals from the averaging network when the input signals differ by a predetermined amount from the average output.

I intend to provide a circuit which may be used as a voter in redundant systems and which provides an output corresponding to the average of the input signals applied to the circuit. Furthermore, if an input signal differs from the output by a predetermined amount that input signal will be isolated so as not to affect the average output. I further intend to permanently isolate an input signal which differs from the average output by a predetermined amount for a predetermined time interval. The averaging circuit is intended to include an indicator for indicating which input signal has been permanently isolated. It is intended that each input signal *not* differing from the average output by a predetermined amount be reduced by a factor 1/N, where N is the number of signals *not* differing from the average output by the predetermined amount.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for illustration purposes only and is not to be construed as defining the limits of the invention.

DESCRIPTION OF THE DRAWING

The single FIGURE of the drawing is a schematic diagram of a four-input circuit constructed in accordance with the present invention for providing an output signal having an amplitude corresponding to the average amplitude of acceptable input signals applied to the circuit.

DESCRIPTION OF THE INVENTION

Referring to the drawing an acceptable signal averaging circuit, constructed in accordance with the present invention, reduces acceptable input signals and sums the reduced signals to provide an output having an amplitude corresponding to the average amplitude of the acceptable input signals. An acceptable input signal is an input signal that *does not* differ from the average output by a predetermined amount. The averaging circuit includes a conventional type operational amplifier 1, and a plurality of signal processing channels which provide the reduced signals. One channel includes an input terminal 2, receiving an input signal $E_1$, of a group of input signals $E_1$ through $E_{1C}$, connected in series with a summing resistor 4, and an electronic switch 8, which is also connected to an input of amplifier 1. The channel also includes a conventional type comparator 14 connected to switch 8 through an OR-gate 20 and connected between terminal 2 and the output of amplifier 1, and a resistor 15 connected between the output of amplifier 1 and the connection between resistor 4 and electronic switch 8.

Terminal 2 provides signal $E_1$ to summing resistor 4 and to comparator 14. Summing resistor 4 cooperates with resistor 15 to reduce signal $E_1$ to provide reduced signal $E_2$ to switch 8. Resistor 15 is connected in parallel with resistors 15A, 15B, and 15C as hereinafter explained. The parallel resistors causes signal $E_2$ to have an amplitude corresponding to the amplitude of signal $E_1$ divided by the number of acceptable input signals. Switch 8 passes signal $E_2$ to amplifier 1 during the absence of a command signal from comparator 14 which occurs when signal $E_1$ is an acceptable input signal and blocks signal $E_2$ in response to a command signal from comparator 14 which occurs when signal $E_1$ is in an unacceptable input signal. Amplifier 1 amplifies the sum of the reduced signals to provide an output $E_5$ which corresponds to the average of acceptable input signals.

Comparator 14 determines if signal $E_1$ is an acceptable input signal by comparing signal $E_1$ with output $E_5$. When the difference between signal $E_1$ and output $E_5$ does not exceed a predetermined threshold level of comparator 14, signal $E_1$ is acceptable and comparator 14 provides no command signal. Comparator 14 provides a command signal to switch 8, through an OR-gate 20, when the difference between signal $E_1$ and voltage $E_2$ exceeds the predetermined threshold level. When the difference between signal $E_1$ and output $E_5$ exceeding the threshold level is momentary, comparator 14 removes the command signal permitting switch 8 to again pass reduced signal $E_2$ when the difference between input signal $E_1$ and output $E_5$ drops below the threshold level.

Resistor 15 also operates as a feedback resistor since it connects the output of amplifier 1 to the input of amplifier 1 through electronic switch 8 when electronic switch 8 is conducting and thus is in parallel with resistors 15A, 15B, and 15C and the resistance values of resistors 4, 4A, 4B, and 4C determines the gain of amplifier 1 and the amplitudes of the reduced signals. For purpose of explanation, resistors 4, 4A, 4B, and 4C may be considered as being connected in parallel when the input signals applied to those resistors are acceptable input signals. The gain $G$ of amplifier 1 would then be $$G = (\tfrac{1}{4})R_{15}/(\tfrac{1}{4})R_4$$

When electronic switch 8, 8A, 8B, or 8C blocks an unacceptable signal, the electronic switch in affect disconnects one of the resistors 4, 4A, 4B, or 4C, respectively. Unless a corresponding feedback resistor 15, 15A, 15B, and 15C is also disconnected from the parallel combination of feedback resistors 15, 15A, 15B, and 15C, the gain $G$ of amplifier 1 will decrease. By connecting feedback resistors 15, 15A, 15B, and 15C to electronic switches 8, 8A, 8B, and 8C, as shown in the FIGURE, a corresponding feedback resistor is disconnected when an electronic switch blocks an unacceptable signal so as to maintain the gain of amplifier 1.

The disconnecting of a feedback resistor 15, 15A, 15B, or 15C also causes the amplitudes of the other reduced signals being applied to amplifier 1 to increase.

Each channel also has latching means, including a delay circuit 17, having a predetermined time delay, connected to comparator 14 and a conventional type flip-flop 18 connected to delay circuit 17 and OR-gate 20. The latching means renders switch 8 non-conducting until reset when the difference between signal $E_1$ and output $E_5$ exceeds the threshold level of comparator 14 over a predetermined time interval. When the command signal from comparator 14 does not exceed the predetermined time delay of circuit 17, circuit 17 provides no output. When the command signal from comparator 14 exceeds the predetermined time delay of circuit 17, circuit 17 triggers flip-flop 18 which provides a command signal to electronic switch 8, through OR-gate 20, until flip-flop 18 is reset. An indicator 23 connected to flip-flop 18 provides an indication that the difference between signal $E_1$ and output $E_5$ has exceeded the threshold level over the predetermined time interval in response to a command signal from flip-flop 18.

Elements having the suffixes A, B, and C are connected and operate in a similar manner as elements having the same numeric designation without a suffix.

The reset circuit for flip-flop 18, 18A, 18B, and 18C include a switch 30, which may be a momentary "on" toggle switch, connected to flip-flops 18, 18A, 18B, and 18C and a source 32 of a fixed direct current voltage. Activation of switch 30 causes switch 30 to provide a direct current voltage to flip-flops 18, 18A, 18B, and 18C resetting those flip-flops.

Amplifier 1 also has a feedback circuit including a capacitor 27 and a bleeder resistor 25 connected between the output and the input of amplifier 1. Resistor 25 has a resistance value that is sufficiently higher than the resistors 15, 15A, 15B, and 15C, which are in parallel with resistor 25 when operating as feedback resistors, so that resistor 25 does not affect the gain of amplifier. Capacitor 27 provides a small time lag so that instantaneous changes between the input signals $E_1$ through $E_{1C}$ does not cause the signals to be removed and permits at least one acceptable input signal to cause amplifier 1 to provide output $E_5$.

Under a special condition where there are two unacceptable input signals, a change in one of the two remaining acceptable input signals, causing that signal to become an unacceptable input signal, can occur instantaneously or gradually. When the change is instantaneous, the changed signal will be isolated as an unacceptable input signal since output $E_5$ will not change instantly due to capacitor 27 and resistor 25. However when the change is gradual, output $E_5$ will have an amplitude corresponding to the average of the changed input signal and the remaining acceptable input signal which would have to be detected by other means in a system using the device of the present invention.

The signal averaging circuit heretofore described compares each input signal applied to the averaging circuit with an output from the averaging circuit. The averaging circuit of the present invention sums reduced input signals, each input signal being reduced by a factor 1/N, where N is the number of acceptable input signals. The averaging circuit isolates an input signal that differs from the output by a predetermined amount and when the difference exist over a predetermined time interval the averaging circuit permanently isolates the input signal and indicates which input signal has been permanently isolated.

What is claimed is:

1. A circuit for providing an output corresponding to the average of acceptable input signals and for eliminating unacceptable input signals which differ from the average by a predetermined amount, comprising averaging means responsive to the input signals for providing an output corresponding to the average of acceptable input signals, means connected to the output of the averaging means for comparing each input signal to the average output, switching means included in the averaging means connected to the comparing means for eliminating unacceptable input signals from the averaging means when the input signals differ a predetermined amount from the average output and said averaging means further including means receiving the input signals and connected to said switching means for reducing each acceptable input signal by a factor of 1/N, where N is the number of acceptable input signals, and applying the reduced acceptable signals and the unacceptable signals to the switching means which is rendered conductive by the comparing means to pass the reduced acceptable signals and rendered non-conductive by the comparing means to block the unacceptable signals; the averaging means still further including summing means connected to the switching means for summing reduced signals passed by the switching means and providing the average output; said summing means includes amplifying means for amplifying the sum signal to provide the average output; and wherein the switching means is a plurality of individual switching means for each of said input signals having first and second terminals, and the amplifying means includes an operational amplifier for amplifying the average of a number of acceptable input signals having its input terminal connected to the first terminals of all the switching means, input and output circuits for said amplifier, said input circuit comprising a first plurality of resistors, each being connected to the second terminal of its respective switching means for receiving individually a respective input signal, and said output circuit comprising a second plurality of resistors, each being connected to the output terminal of the amplifier and to the second terminal of its respective switching means to operate as a feedback resistor for said amplifier when said switching means is rendered conductive and not to operate as a feedback resistor when said switching means is rendered non-conductive to maintain the gain of said amplifier constant with varying number of acceptable input signal, and to provide in combination with a respective resistor of the first plurality of resistors a reduction in the amplitude of its respective input signal when said switching means is conductive, and an increase in the amplitude of each acceptable signal when said switching means is rendered non-conductive so as to maintain an average of acceptable signals irrespective of the number thereof.

2. A circuit for providing an output corresponding to the average of acceptable input signals and for eliminating unacceptable input signals which differ from the average by a predetermined amount, comprising averaging means responsive to the input signals for providing an output corresponding to the average of acceptable input signals, means connected to the output of the averaging means for comparing each input signal to the average output, switching means included in the averaging means connected to the comparing means for eliminating unacceptable input signals from the averaging means when the input signals differ a predetermined amount from the average output and said averaging means further including means receiving the input signals and connected to said switching means for reducing each acceptable input signal by a factor of 1/N, where N is the number of acceptable input signals, and applying the reduced acceptable signals and the unacceptable signals to the switching means which is rendered conductive by the comparing means to pass the reduced acceptable signals and rendered non-conductive by the comparing means to block the unacceptable signals; the comparing means includes a plurality of comparators, each comparator being connected to the switching means and to the averaging means and receiving a different input signal and comparing the input signal with the average output from the averaging means for controlling the switching means in accordance with the comparison; and further comprising means for controlling the switching means to eliminate an input signal that was an unacceptable signal for a predetermined time interval and including a plurality of delay circuits, each delay circuit being connected to a different comparator and controlled by the comparator to provide an output when the input signal differs from the average output by a predetermined amount for a predetermined time; a plurality of flip-flops, each flip-flop connecting a corresponding delay circuit to the switching means and responsive to an output from the delay circuit to control the switching means to eliminate the input signal that differed from the average output by the predetermined amount for the predetermined time, and means connected to the flip-flops for resetting the flip-flops.

3. A circuit of the kind described in claim 2, further comprising a plurality of indicators, each indicator being connected to a corresponding flip-flop and providing an indication when the flip-flop controls the switching means to eliminate the input signal.

* * * * *